US008006676B2

(12) United States Patent
Tabata et al.

(10) Patent No.: US 8,006,676 B2
(45) Date of Patent: Aug. 30, 2011

(54) CONTROL DEVICE FOR ENGINE

(75) Inventors: Masakazu Tabata, Susono (JP);
Tomohiro Kaneko, Mishima (JP)

(73) Assignee: Toyota Jidosha Kabushiki Kaisha,
Toyota-shi (JP)

( * ) Notice: Subject to any disclaimer, the term of this patent is extended or adjusted under 35 U.S.C. 154(b) by 498 days.

(21) Appl. No.: 11/887,280

(22) PCT Filed: Mar. 31, 2006

(86) PCT No.: PCT/JP2006/307385
§ 371 (c)(1),
(2), (4) Date: Feb. 19, 2009

(87) PCT Pub. No.: WO2006/104271
PCT Pub. Date: Oct. 5, 2006

(65) Prior Publication Data
US 2009/0211554 A1   Aug. 27, 2009

(30) Foreign Application Priority Data

Mar. 31, 2005   (JP) ................................. 2005-103626

(51) Int. Cl.
*F02B 33/00* (2006.01)
*G06F 7/00* (2006.01)
(52) U.S. Cl. ....................................... 123/564; 701/103
(58) Field of Classification Search .................. 123/435, 123/564; 701/103
See application file for complete search history.

(56) References Cited

U.S. PATENT DOCUMENTS

| 4,539,956 | A | * | 9/1985 | Hengel et al. ................. 123/357 |
| 4,957,071 | A | * | 9/1990 | Matsuo et al. ............ 123/184.36 |
| 5,224,853 | A | * | 7/1993 | Kazuo et al. .................... 60/602 |
| 5,622,049 | A | * | 4/1997 | Kitamura et al. ............... 60/285 |
| 6,386,179 | B1 | * | 5/2002 | Hammoud et al. ........... 123/348 |
| 6,422,184 | B1 | * | 7/2002 | Kreuter ....................... 123/73 V |

FOREIGN PATENT DOCUMENTS

| DE | 197 54 287 A1 | 6/1999 |
| DE | 102 22 202 A1 | 11/2003 |
| JP | 61-286520 A | 12/1986 |
| JP | 63-268920 A | 11/1988 |
| JP | 02-130220 A | 5/1990 |

(Continued)

OTHER PUBLICATIONS

Holger Findeisen, et al.: "Development of an Actuator for a Fast Moving Flap for Impulse Charging", SAE Technical Paper Series, Society of Automotive Engineers, Warrendale, PA, US, vol. 2003-01-0402, Jan. 1, 2003.

(Continued)

*Primary Examiner* — Mahmoud Gimie
*Assistant Examiner* — David Hamaoui
(74) *Attorney, Agent, or Firm* — Kenyon & Kenyon LLP

(57) ABSTRACT

An engine comprises an intake control valve disposed in an intake passage at an upstream side of an intake valve in each cylinder for individually opening/closing the intake passage, an actuator for opening/closing the intake control valve, and a control device for controlling an operation of the actuator, wherein the control device controls the actuator to delay opening of the intake control valve in relation to opening of the intake valve, thus performing the supercharge. Supercharge correction is further performed for correcting operating timing of the actuator so that unbalance in a supercharge air quantity between the cylinders in the engine is suppressed.

12 Claims, 16 Drawing Sheets

FOREIGN PATENT DOCUMENTS

| | | |
|---|---|---|
| JP | 4-86326 A | 3/1992 |
| JP | 5-50031 | 7/1993 |
| JP | 06-002550 A | 1/1994 |
| JP | 10-196374 A | 7/1998 |
| JP | 2000-274253 A | 10/2000 |

OTHER PUBLICATIONS

*Impulses for Greater Driving Fun* of Pamphlet relating to the issue from Siemens VDO Automotive AG, Sep. 9, 2003 issue.

\* cited by examiner

CONTROL DEVICE FOR ENGINE

FIELD OF THE INVENTION

The present invention relates to an engine with an intake control valve disposed in an intake passage at the upstream side of an intake valve for opening/closing the intake passage and in particular, to an engine for optimization of an operating state of an intake control valve.

BACKGROUND OF THE INVENTION

There has been an attempt of disposing an intake control valve with good response at the upstream side of an intake valve in an intake passage in an internal combustion engine for supercharging. In such an engine, the intake control valve is controlled to open after opening timing of the intake valve and closed in proximity to closing timing of the intake valve. As a result, air in the intake passage positioned at the upstream side of the intake control valve abruptly flows into a combustion chamber under a negative pressure at a last period of an intake stroke of the engine, and a great deal of the air can be filled inside the combustion chamber due to a kind of an inertia supercharge effect.

This supercharge, which is called pulse charge or impulse charge, is more excellent in control response than a turbo charge system and can eliminate a so-called acceleration delay of a vehicle. The technology relating to such pulse charge is in detail disclosed in "Impulses for Greater Driving Fun" which was press-released on September 9 from Siemens VDO Automotive AG in 2003 Frankfurt Motor Show, for example. [Non-Patent Document 1] "Impulses for Greater Driving Fun" of Pamphlet relating to the issue from Siemens VDO Automotive AG (issue of the ninth of September 9 in 2003).

However, although a large variation in an intake air quantity occurs caused by a minute change in open ing timing of the intake control valve, conventionally this pulse charge is, performed without taking into account a characteristic balance between the cylinders for an engine having a plurality of cylinders.

Therefore, an object of the present invention is to provide a control device which can suppress unbalance in characteristic between a plurality of cylinders in an engine capable of performing pulse charge.

SUMMARY OF THE INVENTION

The present invention is provided with a control device for an engine comprising an intake control valve disposed in an intake passage at an upstream side of an intake valve in each cylinder for individually opening/closing the intake passage, an actuator for opening/closing the intake control valve, and control means for controlling an operation of the actuator, wherein the control means controls the actuator to delay opening of the intake control valve in relation to opening of the intake valve, thus performing supercharge of the engine, and further comprising supercharge correction means for individually correcting operating timing of the actuator based on state value detected for each of the cylinders so that unbalance in a supercharge air quantity between the cylinders in the engine is suppressed.

In the present invention, the control means controls the actuator to perform the supercharge by using the intake control valve, and the supercharge correction means individually corrects the operating timing of the actuator based on state value detected for each of the cylinders so that fluctuation in an operating condition of the engine is suppressed. In consequence, the present invention can suppress unbalance in characteristic between a plurality of cylinders in an engine capable of performing pulse charge.

Preferably, the supercharge correction means in the present invention corrects the operating timing based upon a deviation in the state values between the cylinders of the engine.

In addition, the state value may be a rotational speed of the engine.

The state value in the present invention may be an air quantity in an intake passage of the engine. This air quantity may be detected based upon a pressure in the intake passage at a downstream side of the intake control valve and at the upstream side of the intake valve, or based upon an intake flow quantity or a pressure in the intake passage at the upstream side of the intake control valve. The state value may be an air-fuel ratio.

The control means in the present invention can stop the intake control valve at a fully open state in a case where the deviation of state values is greater than a predetermined value.

In a case of the engine further comprising injection quantity correction means for correcting a fuel injection quantity of the engine, correction instruction means for instructing execution of the correction to the supercharge correction means and the injection quantity correction means is provided, where the correction instruction means instructs to execute the injection quantity correction means with priority in a case where execution conditions of the supercharge correction means and the injection quantity correction means are both met. If variations in an operation of the intake control valve are corrected in a state where variations in a fuel injection quantity between the cylinders are not corrected, it is required to perform the variation correction in the operation of the intake control valve once more as a result of thereafter having performed the variation correction of the fuel injection quantity, because the correction for the intake control valve is performed in such a manner as to compensating for the variations in the fuel injection quantity. Accordingly, by instructing to execute the injection quantity correction means with priority, need for repetitive correction relating to the intake control valve would be eliminated.

In an engine performing the injection quantity correction means with priority, even when the execution conditions of the supercharge correction means and the injection quantity correction means are both met, when a required air quantity of the engine is greater than a first reference value, the supercharge correction means may be executed with priority. In a region where the required air quantity is large, the variations in the supercharged air quantity is more dominant in terms of the influence on engine performance than the variations in the fuel injection quantity. Therefore, as the supercharge correction means is executed before the correction relating to the injection quantity in such a case, the supercharge correction with relatively high accuracy can be performed.

In an engine executing a injection quantity correction means with priority, even when the execution conditions of the supercharge correction means and the injection quantity correction means are both met, the supercharge may be performed without instructing to execute any of the supercharge correction means and the injection quantity correction means when a required air quantity of the engine is greater than a second reference value. In this case, the supercharge can be performed earlier in response to the necessity of the supercharge, enabling an improvement on drivability by suppression of an acceleration delay.

In addition, even in a case where the execution conditions of the supercharge correction means and the injection quantity correction means are both met, the supercharge correction means may be instructed to execute with priority, when an air-fuel ratio of the engine is smaller than a third reference value. In a region where an air-fuel ratio (A/F) of the engine is small, that is, in a rich region, the variations in the supercharged air quantity is more dominant in terms of the influence on engine performance than the variations in the fuel injection quantity. Therefore, if the supercharge correction means is performed before the correction relating to the injection quantity in such a case, the supercharge correction with relatively high accuracy can be performed.

In addition, even when the execution conditions of the supercharge correction means and the injection quantity correction means are both met, the correction instruction means may instruct to execute the supercharge without instructing to execute any of the supercharge correction means and the injection quantity correction means, when a required air quantity of the engine is greater than a fourth reference value. In this case, the supercharge can be performed earlier in response to the necessity of the supercharge, enabling an improvement on drivability by suppression of an acceleration delay. It should be noted that the fourth reference value may be the same value as the second reference value or a value different from that.

DETAILED DESCRIPTION

Embodiments where an intake control device according to the present invention is applied to a direct-injection type gasoline engine will be in detail explained with reference to the drawings. However, the present invention is not limited to such embodiments and can include all alternations and modifications contained in the concept of the present invention described in claims, and accordingly can be applied to other arbitrary technologies within the scope of the spirit of the present invention without mentioning.

Figure 1:
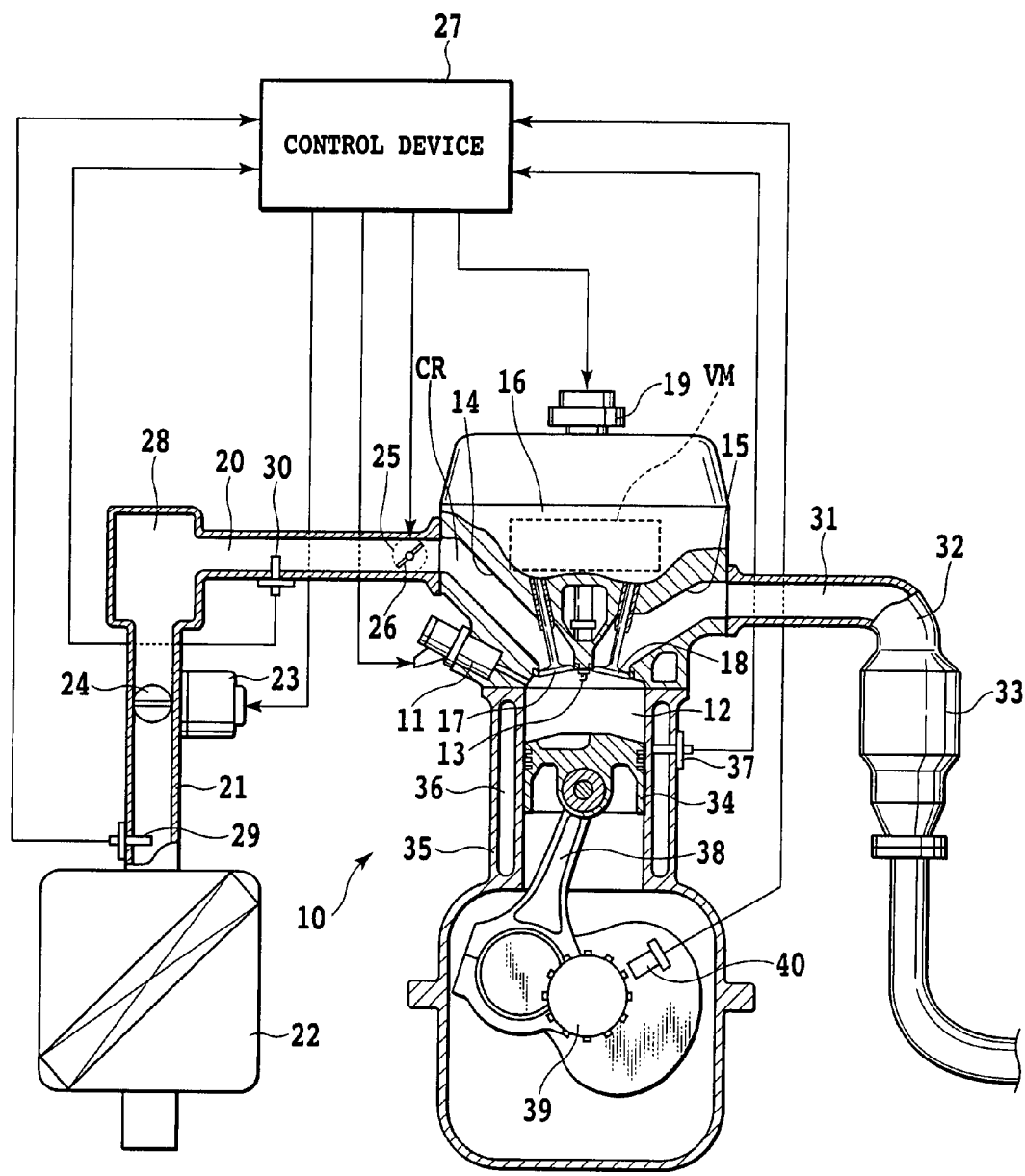
FIG. 1 is a concept diagram of an embodiment where an intake control device according to the present invention is applied to a direct-injection type gasoline engine.

FIG. 1 shows a concept of an engine system in a first embodiment. An engine 10 in the present embodiment is a spark ignition type engine which directly injects gasoline as fuel into a combustion chamber 12 from a fuel injection valve 11 and ignites it by a spark plug 13, and may use alcohol, LPG (liquid natural gas) or the like as fuel. In addition, a compression ignition type engine may be used.

An intake port 14 and an exhaust port 15 respectively exposed to the combustion chamber 12 are formed in a cylinder head 16 in which an intake valve 17 opening/closing the intake port 14 and an exhaust valve 18 opening/closing the exhaust port 15, a valve operating mechanism VM for driving the intake valve 17 and the exhaust valve 18, and the spark plug 13 for igniting a mixture in the combustion chamber 12 are incorporated and further, an ignition coil 19 for generating a spark in the spark plug 13 is mounted.

The valve operating mechanism VM is capable of individually controlling the intake valve 17 and the exhaust valve 18 at an arbitrary opening timing and includes solenoids disposed in the intake valve 17 and the exhaust valve 18 respectively. It should be noted that in place of the above construction, a variable valve timing mechanism may be used as the valve operating mechanism VM, which can arbitrarily change the valve timing and the cam profile by switching two kinds of cams by a hydraulic pressure.

An intake pipe 21 is connected to the cylinder head 16 in such a manner as to be communicated with the intake port 14 to define an intake passage 20 together with the intake port 14. An air cleaner 22 is disposed at the upstream side of the intake pipe 21 for removing dusts or the like contained in air and introducing the air to the intake passage 20. A part of the intake pipe 21 positioned at the downstream side of the air cleaner 22 incorporates a throttle valve 24 therein, an opening of which is adjusted by a throttle actuator 23 based upon a depressing amount of an accelerator pedal (not shown) operated by a driver. In the present embodiment, a depressing operation of the accelerator pedal and an opening/closing operation of the throttle valve 24 are independent and the throttle valve 24 is electrically controllable, but the accelerator pedal and the throttle valve 24 may be mechanically connected.

Further, a part of the intake passage 20 positioned at the downstream side of the throttle valve 24 incorporates an intake control valve 26 therein which opens/closes the intake passage 20 by the actuator 25 at a timing predetermined in relation to opening/closing timing of the intake valve 17. In a case where the engine 10 includes a plurality of intake ports 14 per a cylinder, the intake control valve 26 can be independently disposed in each intake port 14 to individually open/close each intake port 14, but the intake control valve 26 may be opened/closed for every cylinder. Each of the intake control valve 26 and the actuator 25 has an extremely high control response so that the intake control valve 26 accurately opens/closes at desired timing in relation to the opening/closing timing of the intake valve 17.

Figure 3:
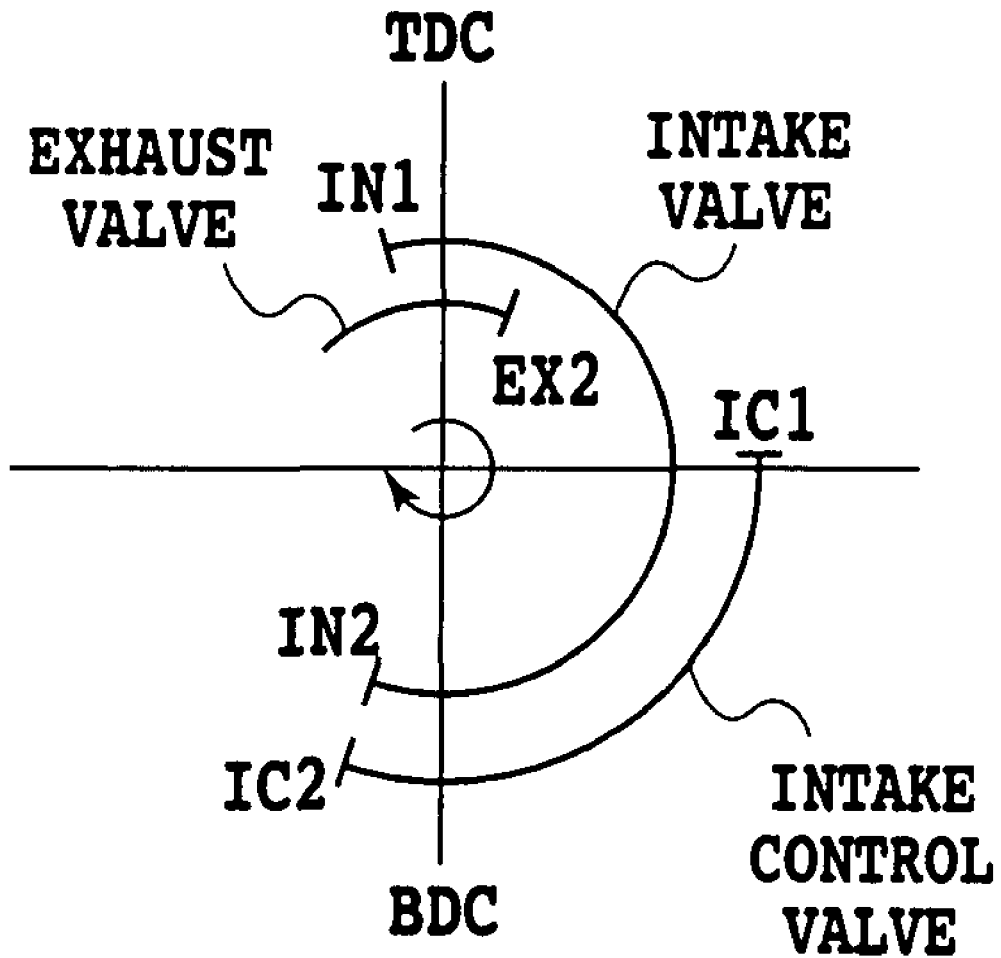
FIG. 3 is a timing diagram showing one example of opening/closing timing of an intake valve, an exhaust valve and an intake control valve.

The intake control valve 26 in the present embodiment is, as shown in FIG. 3, controlled by the actuator 25 based upon instructions from the control device 27 in such a manner as to open at a timing later than the opening timing of the intake valve 17 and close in proximity to the closing timing of the intake valve 17. As a result, the air in the intake passage 20 positioned at the upstream side of the intake control valve 26 abruptly flows into the combustion chamber 12 which is in a negative pressure state at the last period of the intake stroke of the engine 10, thus making it possible for a great deal of air to be filled inside the combustion chamber 12 due to a kind of inertia charge effect (pulse charge). In other words, in the pulse charge using the intake control valve 26, a substantial supercharge is to start immediately after the start of control by using the inertia of the intake air and the negative pressure generated at the downstream side of the intake control valve 26.

Figure 2:
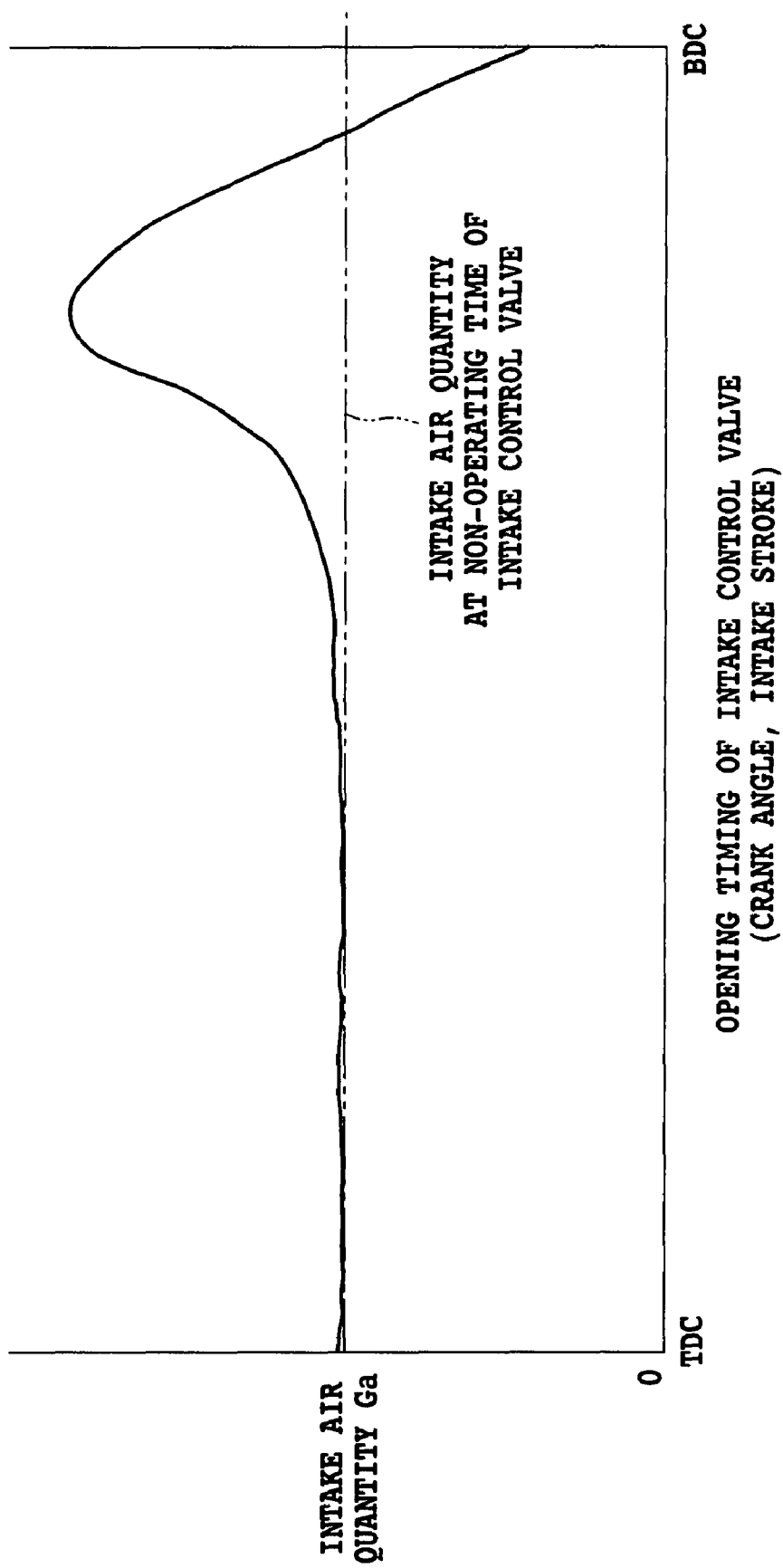
FIG. 2 is a graph showing variations in an intake air quantity in a case of changing opening timing of an intake control valve during an intake stroke of an engine.

FIG. 2 shows a relation between opening timing of the intake control valve 26 and intake air quantity in a case where the intake control valve 26 opens at an arbitrary crank angle phase from TDC (Top Dead Center) to BDC (Bottom Dead Center) of the piston 34 during an intake stroke and closes at BDC. The opening timing of the intake control valve 26 is shown in the crank angle phase of the lateral axis and it is seen that the intake air quantity changes in response to changing the opening timing of the intake control valve 26. Accordingly, by opening the intake control valve 26 in close proximity to a point where the intake air quantity is maximized, it is possible to fill a great amount of air into the combustion chamber 12.

Again in FIG. 1, the intake pipe 21 is provided with a surge tank 28 formed in the midst thereof, and also an intake temperature sensor 29 for detecting a temperature of intake air flowing in the intake passage 20 to output the detected temperature to the control device 27 and an intake pressure sensor 30 for detecting an intake pressure in the intake passage 20 to output the detected pressure to the control device 27 mounted therein.

A three-way catalyst 33 for purifying an exhaust gas from the combustion chamber 12 is incorporated in the midst of an exhaust pipe 32 connected to the cylinder head 16 so as to be communicated with the exhaust port 15 for defining an exhaust passage 31 together with the exhaust port 15. It is effective to incorporate a plurality of three-way catalysts 33 in series along the exhaust passage 31.

Accordingly, the intake air supplied from the intake pipe 21 into the combustion chamber 12 through the air cleaner 22 forms a mixture together with the fuel injected into the combustion chamber 12 from the fuel injection valve 11. The formed mixture is ignited and burned by a spark of the spark plug 13 and the exhaust gas caused thereby is discharged through the three-way catalyst 33 from the exhaust pipe 32 to an atmosphere.

A cylinder block 35 in which a piston 34 reciprocates is provided with a water temperature sensor 37 for detecting a temperature of a cooling water inside a water jacket 36 formed in the cylinder block 35 to output the detected temperature to the control device 27, and a crank angle sensor 40 for detecting a rotational phase of a crank shaft 39 connected to the piston 34 through a connecting rod 38, that is, a crank angle to output the detected crank angle to the control device 27. In the present embodiment, this crank angle sensor 40 is utilized as an engine rotational speed sensor.

The control device is adapted to control operations of the fuel injection valve 11, the ignition coil 19, the throttle actuator 23, the actuator 25 and the like in such a manner as to perform a smooth operation of the engine 10 according to preset programs based upon detection signals from these sensors 29, 30, 37, 40 and the like.

The control device 27 calculates an intake air quantity according to a detection value of an air flow meter (not shown) and calculates an engine rotational speed according to a detection value of the crank angle sensor 40. In addition, the control device 27 calculates a basic injection quantity of the fuel based upon an intake air quantity and an engine rotational speed.

Further, the control device 27 performs various corrections to the calculated basic injection quantity to calculate a fuel injection quantity. The various corrections to be performed to the basic injection quantity includes the correction processes based upon an intake air temperature, an engine water temperature, an exhaust gas temperature, an air-fuel ratio and the like and in addition to it, includes an equalization process for individually correcting opening timing of each fuel injection valve 11 so that the unbalance in fuel injection quantity between the cylinders is suppressed.

The equalization process determines a deviation between a rotational speed of a specific cylinder (or time required for rotation of a predetermined crank angle (for example, 30° C.A)) and an average rotational speed of all cylinders to set a correction quantity (coefficient) of the fuel injection quantity at each cylinder to reduce the deviation by referring to a predetermined injection correction map in accordance with the deviation. The control device 27 multiplies the basic injection quantity by the set correction quantity together with other correction quantities based upon an intake air temperature or the like to correct the fuel injection quantity. The equalization process is executed at a predetermined timing suitable for the correction in addition to vehicle shipment timing.

Figure 4:
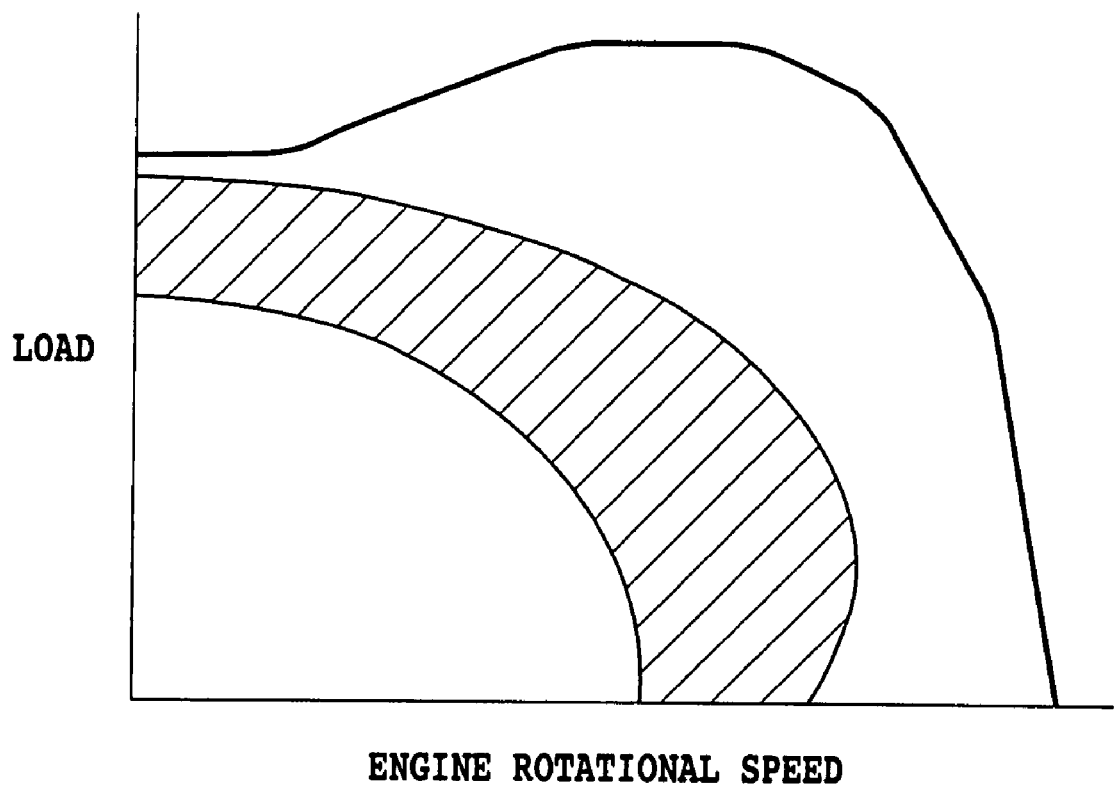
FIG. 4 is a graph showing an execution region for valve opening during a compression stroke set at a timing map for valve opening during a compression stroke.

The control device 27 has an intake control valve timing map for defining opening/closing timing of the intake control valve 26 in response to opening/closing timing of the intake valve 17, and the actuator 25 is controlled by the control device 27 according to the intake control valve timing map by the control device 27. In addition, the control device 27 has a supercharge control execution region map for defining a region of operating the supercharge control valve 26 in accordance with an engine rotational speed and a required load. The characteristic of the supercharge control execution region map is generally as shown in FIG. 4 and the supercharge control valve 26 is operated in a region hatched in FIG. 4 to perform the supercharge control.

The control device 27 in the present embodiment executes a supercharge correction process for correcting opening timing of the actuator 25 at each cylinder so as to suppress unbalance in the supercharge air quantity between the cylinders. This supercharge correction process is executed at a predetermined timing suitable for the correction in addition to the vehicle shipment timing. For this purpose, the control device 27 stores a preset supercharge correction quantity map therein. The supercharge correction map is a table type data file for defining a deviation between a rotational speed of a specific cylinder (or time required for rotation across a predetermined crank angle (for example, 30° C.A)) and an average rotational speed of all cylinders and a correction quantity at supercharge timing corresponding to the deviation. A correction quantity (coefficient) for an operating timing of the intake control valve 26 is set at each cylinder by referring to the supercharge correction quantity map, so as to reduce the deviation.

Figure 5:
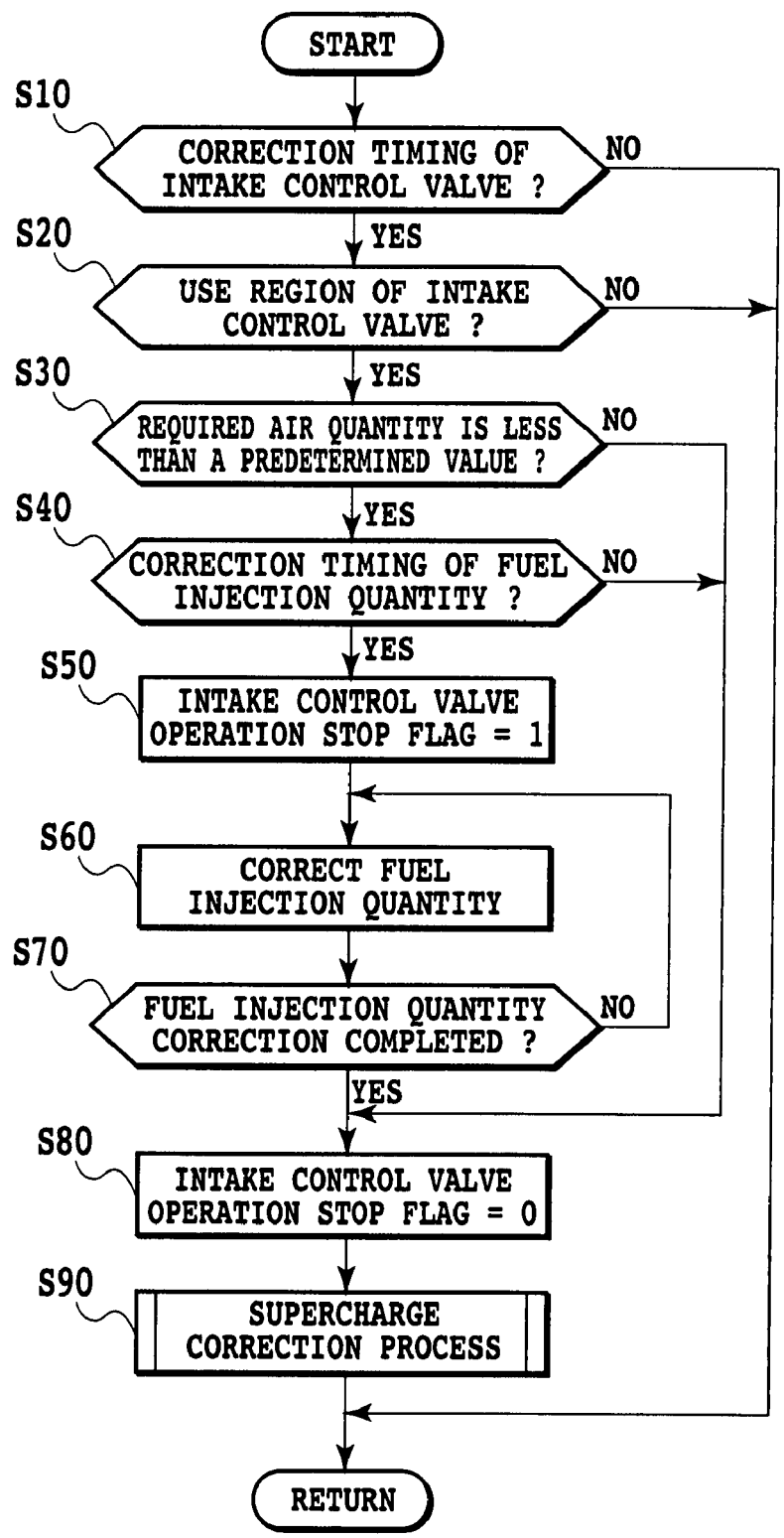
FIG. 5 is a flow chart showing the correction process in a first embodiment of the present invention.

An operation of the present embodiment will be explained. In FIG. 5, firstly in the control device 27, determination is made as to correction timing of the intake control valve 26 (S10). This determination is made based upon whether or not a vehicle is in a state where unbalance of the supercharge air quantity of each actuator 25 between the cylinders possibly occurs, such as an elapse time or a running distance after the previous correction, and whether or not a rotational speed, a load value or their time variation is in a state suitable for the correction (for example, an excessively low rotational speed or load is not suitable for the correction, and an excessively large time variation of a rotational speed or a load, during e.g. a rapid acceleration, is not suitable for the correction).

When the intake control valve 26 is in the correction timing, then it is determined whether or not the current operating condition of the engine 10 is in a use region of the intake control valve 26 (S20). This determination is made by referring to the intake control valve execution region map stored in a memory region of the control device 27 as described above. It should be noted that the process returns in a case where the determination at step S10 or S20 is "NO".

When it is in a use region of the intake control valve 26, then it is determined whether or not a required air quantity Gtrg is less than a predetermined reference value Gp (S30). The required air quantity Gtrg is calculated by a predetermined required air quantity map based upon an engine rotational speed and a required load. The reference value Gp may be a predetermined fixed value or may be dynamically determined by referring to a predetermined map in accordance with a running region (engine rotational speed and required load) from a NOx limit or a smoke limit (a threshold value of a required air quantity, beyond which without performing the pulse charge a NOx emission quantity or a smoke emission quantity would exceed a predetermined value due to shortage of the intake air quantity).

When the required air quantity Gtrg is less than the reference value Gp, then determination is made as to the correction timing of the fuel injection quantity (S40). This determination is made based upon whether or not a vehicle is in a state where unbalance in the fuel injection quantity between the cylinders is likely to occur, —for example, in view of an elapse time or a running distance after the previous injection quantity correction—, and whether or not a rotational speed, a load value or its time variation is in a state suitable for the correction (for example, an excessively low rotational speed or load is not suitable for the correction or, and an excessively large time variation of a rotational speed or load, during, e.g., a rapid acceleration, is not suitable for the correction).

When the fuel injection quantity is in the correction timing, then an intake control valve operation stop flag is set to "1" (S50), thereby prohibiting an operation of the intake control valve 26. In addition, the correction of the fuel injection quantity is made (S80). Since the correction of the fuel injection quantity includes the aforementioned equalization process, the fuel injection quantity between the cylinders is equalized by the fuel injection quantity correction.

On condition that the correction of the fuel injection quantity is completed (S70), the intake control valve operation stop flag is set to "0" (S80), thereby an operation of the intake control valve 26 is permitted.

Nextly, the supercharge correction process is executed (S90). This supercharge correction process individually corrects the opening timing of each actuator 25 so as to suppress unbalance in the supercharge air quantity between the cylinders as described above and one example of the process is shown in a flow chart in FIG. 6.

Figure 6:
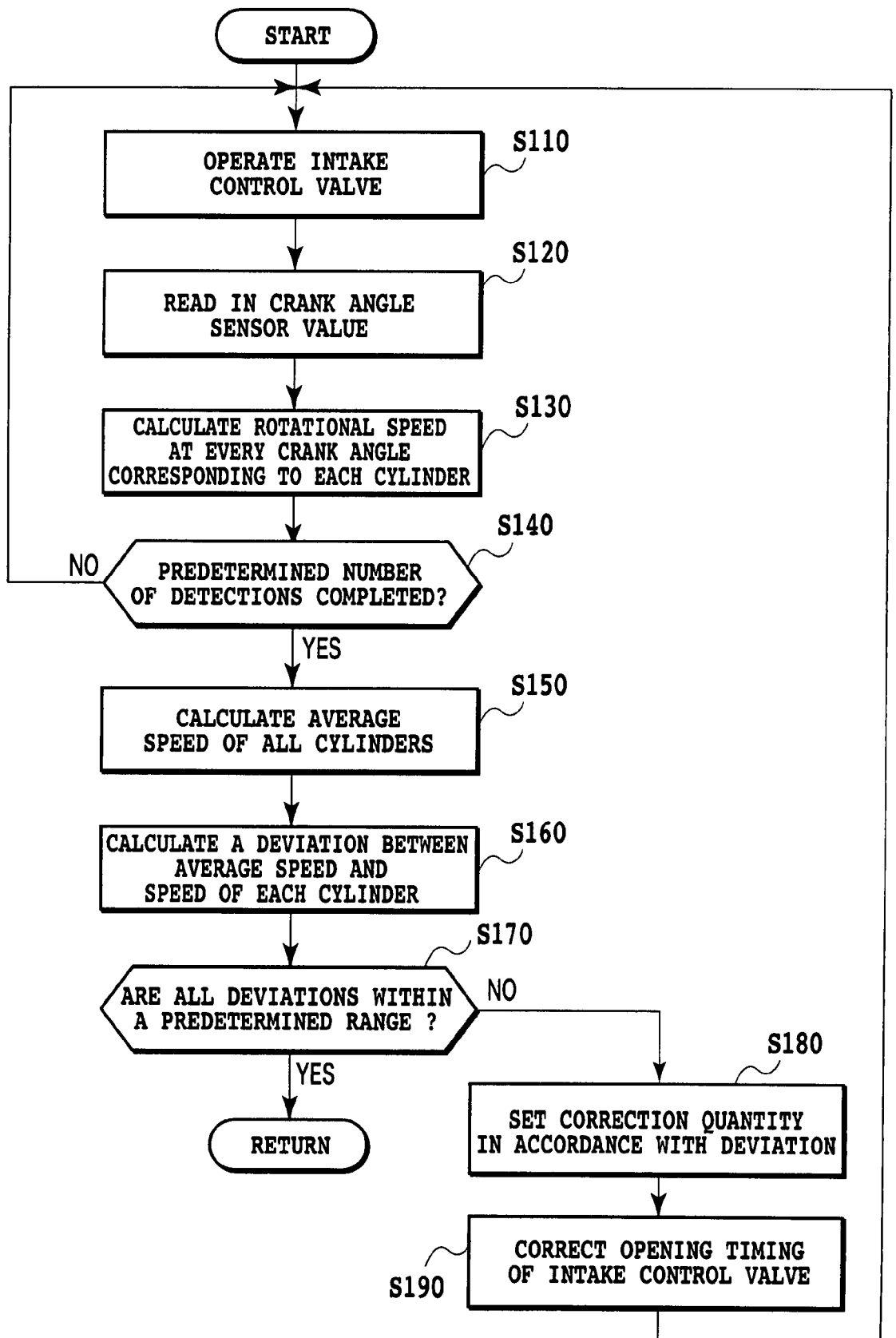
FIG. 6 is a flow chart showing the supercharge correction process in a first embodiment of the present invention.
Figure 7:
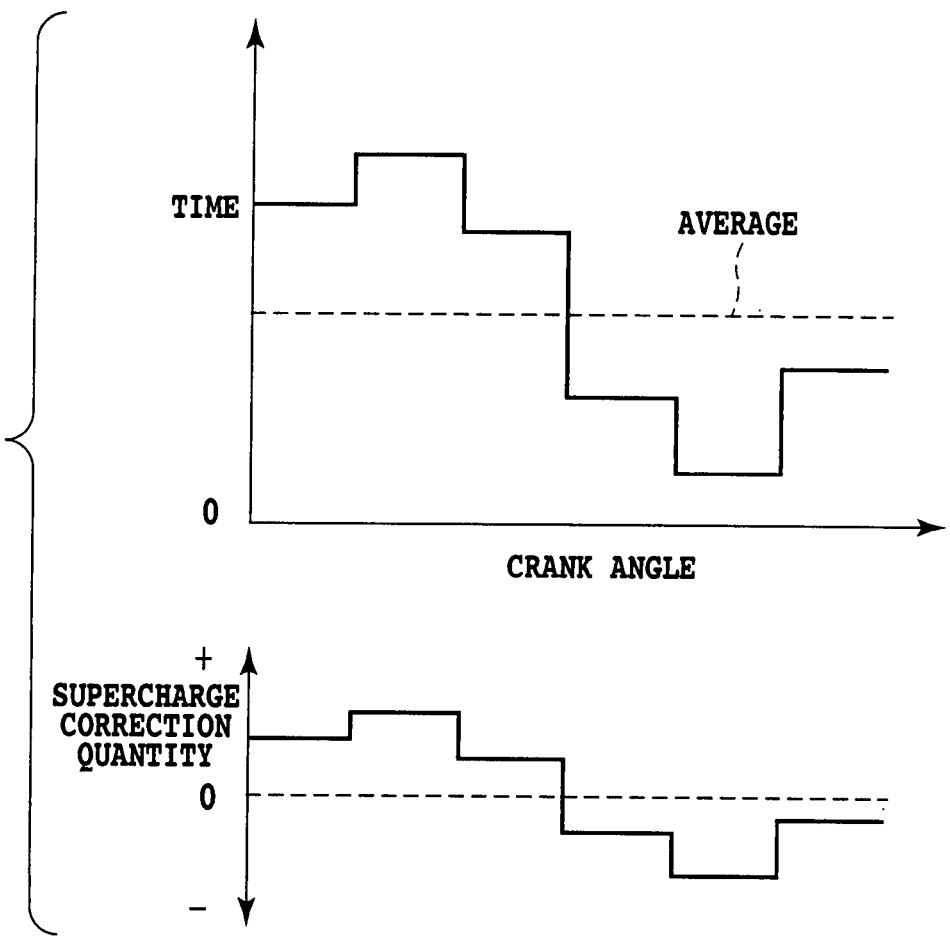
FIG. 7 is a timing diagram showing a relation between fluctuation of a rotational speed of a crank shaft and supercharge correction quantity.

In FIG. 6, firstly, the actuator 25 is driven by the control device 27, thereby operating the intake control valve 26 (S110). In addition, a detection value of the crank angle sensor 40 is read in (S120), and a rotational speed is calculated at every crank angle corresponding to each cylinder (S130). This rotational speed may be assumed as a shaft torque of the crank shaft 39, and is calculated as time required for the crank shaft 39 to rotate across a predetermined angle (FIG. 7). The operations at steps S110 to S130 are repeatedly executed until the predetermined number of the detections is completed (S140).

When the predetermined number of the detections is completed, an average speed of all cylinders (average value of all cylinders for the time required for rotation of a predetermined crank angle) is calculated based upon a rotational speed at each cylinder calculated at step S130 (S150.

Then a deviation between an average speed of all cylinders and a rotational speed of each cylinder is calculated for each cylinder (S160). When the calculated deviation is within a predetermined allowance range at every cylinder, a routine in FIG. 6 returns (S170).

At step S170, if the deviation is out of a predetermined allowance range at least at either one of cylinders, the correction quantity corresponding to the deviation is set at each cylinder (S180). The setting of the correction quantity is made by referring to the aforementioned supercharge correction quantity map by the value of the deviation, and the supercharge correction quantity in accordance with the deviation is calculated and set (FIG. 7). In addition, the opening timing of the intake control valve 26 is corrected for each cylinder by the set correction quantity (S190).

The operations at steps S110 to S190 are repeatedly executed until each deviation of all cylinders becomes within a predetermined range (S170), and on condition that the deviation is within a predetermined range at all cylinders, the present routine returns. As a result of the above processes, the variations of the supercharge air quantity due to existence of the intake control valves 26 is corrected so that the rotational speed of each cylinder is within a predetermined range from the average speed of all cylinders.

As in detail described above, in the present embodiment, the control device 27 controls the actuators 25 to perform the supercharge by using the intake control valves 26 and an operating timing of the actuators 25 is corrected by the supercharge correction process so as to suppress the fluctuation of the operating condition of the engine 10. Accordingly, the present embodiment can suppress unbalance in characteristic between a plurality of cylinders in an engine capable of performing the pulse charge.

In addition, in the present embodiment, since the supercharge correction process is to correct the opening timing based upon the fluctuation of the operating condition of the engine 10 and the operating condition is assumed as a rotational speed of the engine, a desired effect of the present invention can be achieved with a simple construction.

In addition, when the variations of the intake control valve 26 are corrected in a state where the variations of the fuel injection quantity between the cylinders are not corrected, it is required to once more perform the correction of the variations in operation of the intake control valve 26 as a result of having performed the subsequent correction of the variations of the fuel injection quantity, because the correction relating to the intake control valve 26 is performed in a way as to compensate for the variations of the fuel injection quantity. In contrast to it, in the present embodiment, in the engine 10 executing the injection quantity correction process for correcting a fuel injection quantity of the engine, in a case where execution conditions of the supercharge correction process and the injection quantity correction process are both met, the injection quantity correction process is executed with priority (that is, the injection quantity correction process is firstly executed and the supercharge correction process is prohibited, and on condition of termination of the injection quantity correction process, the supercharge correction process is executed). Therefore, since the supercharge correction process is executed after termination of the equalization process of the injection quantity, the supercharge correction process for correcting the variations of the injection quantity between the cylinders is not executed. Accordingly, it is not required to once more perform the correction relating to the intake control valve 26 after the injection quantity correction process is executed.

In addition, in the present embodiment, even when the execution conditions of the supercharge correction process and the injection quantity correction process are both met, when a required air quantity of the engine is greater than a predetermined value, the supercharge correction process is performed with priority (S30). In a region where the required air quantity is large, the variations in the air quantity by the pulse charge are more dominant in terms of the influence on engine performance than the variations in the fuel injection quantity. Therefore, as the device of the present embodiment performs the supercharge correction process before the correction relating to the injection quantity in such a case, the supercharge correction with relatively high accuracy can be performed.

It should be noted that in the present embodiment, even when the execution conditions of the supercharge correction process and the injection quantity correction process are both met, the supercharge correction process is performed with priority when a required air quantity of the engine is greater than a first reference value. However, in addition to such process or in place of such process, when the execution conditions of the supercharge correction process and the injection quantity correction process are both met and when a required air quantity of the engine is greater than a second reference value, the control device 27 may perform the supercharge without performing any of the supercharge correction process and the injection quantity correction process. In this case, the supercharge can be performed quicker in response to the necessity of the supercharge, enabling an improvement on drivability by suppression of an acceleration delay. In this case, the second reference value may be a value different from the first reference value or the same value. When the second reference value is a value different from the first reference value, either one of the supercharge correction process and the supercharge can be executed depending on the degree of the required air quantity.

In addition, even in a case where the execution conditions of the supercharge correction process and the injection quantity correction process are both met, the control device 27 may execute the supercharge correction process with priority when an air-fuel ratio of the engine is smaller than a third reference value. In a region where an air-fuel ratio (A/F) of the engine is small, that is, in a rich region, the variations in the supercharged air quantity are more dominant in terms of the influence on engine performance than the variations in the fuel injection quantity. Therefore, if the supercharge correction process is performed before the correction relating to the injection quantity in such a case, the supercharge correction of certainly high accuracy can be performed.

In addition, even when the execution conditions of the supercharge correction process and the injection quantity correction process are both met, when a required air quantity of the engine is greater than a fourth reference value, the control device 27 may perform the supercharge without performing any of the supercharge correction process and the injection quantity correction process. In this case, the supercharge can be performed earlier in response to the necessity of the supercharge, enabling an improvement on drivability by suppression of an acceleration delay. It should be noted that the fourth reference value may be the same value as the second reference value or a value different from that.

In addition, in the present embodiment, the unbalance in the supercharge air quantity between the cylinders for the supercharge correction process and the equalization process of the injection quantity is detected based upon the fluctuation of the rotational speed of the engine detected by the crank angle sensor 40. However, the unbalance of the supercharge air quantity in the present invention may be detected by other means. For example, an A/F (air-fuel ratio) sensor is disposed in an exhaust path at each cylinder and the unbalance of the supercharge air quantity between the cylinders can be detected based upon a detection values of the A/F sensors. In this case, the unbalance of the air quantity between the cylinders detected based upon the detection value of the A/F sensor may be utilized to one of the supercharge correction process and the equalization process of the injection quantity or to both.

Nextly, a second embodiment of the present invention will be explained. The second embodiment is a modification of the supercharge correction process in the first embodiment. Since the mechanical construction in the second embodiment is the same as that in the first embodiment, the detailed explanation therefor is omitted.

Figure 8:
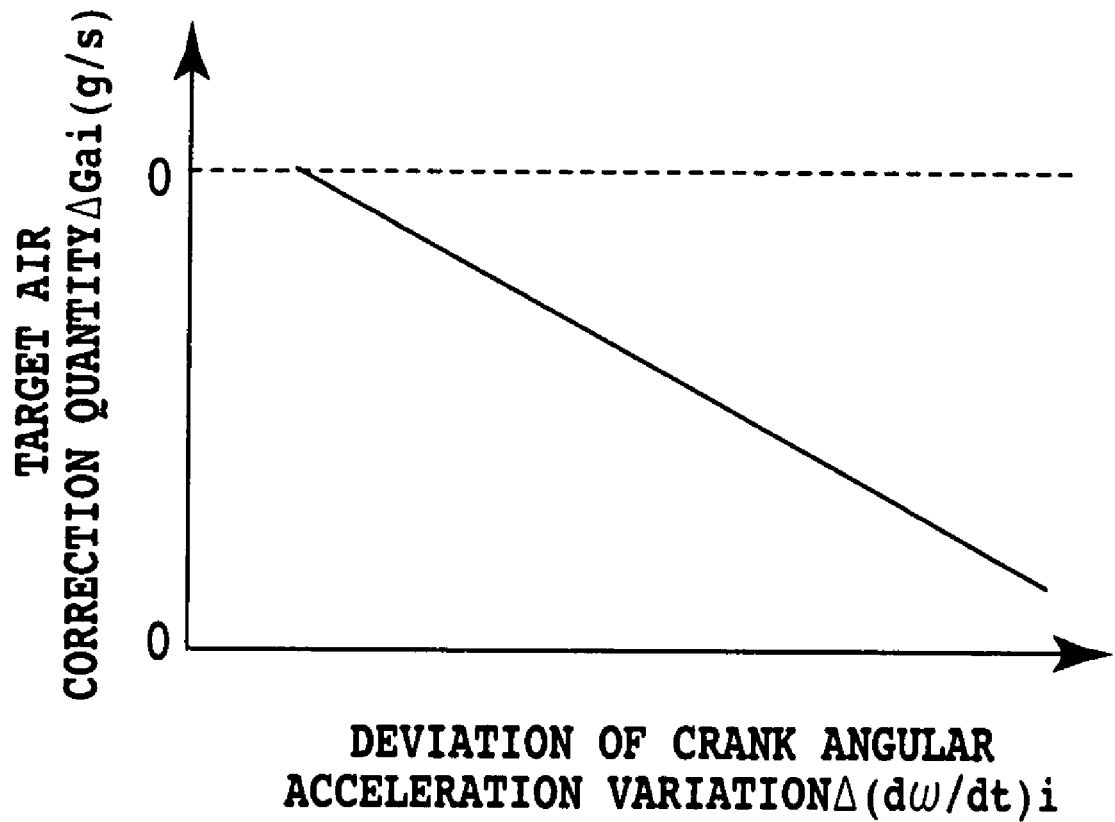
FIG. 8 is a graph showing a setting example of a supercharge correction quantity map used in the supercharge correction process.

As shown in FIG. 8, in the present embodiment, a supercharge correction quantity map used in the supercharge correction quantity associates a deviation $\Delta$ ($d\omega/dt$) with a target supercharge correction quantity $\Delta$ Gai (g/s) for the storing. The deviation $\Delta$ ($d\omega/dt$) is a difference between a value of each cylinder in crank angular acceleration variation and a minimum value. As shown in FIG. 8, the target supercharge correction quantity $\Delta$ Gai (g/s) is zero or a negative value and an absolute value thereof is set to become larger as the deviation $\Delta$ ($d\omega/dt$) is larger.

Figure 9:
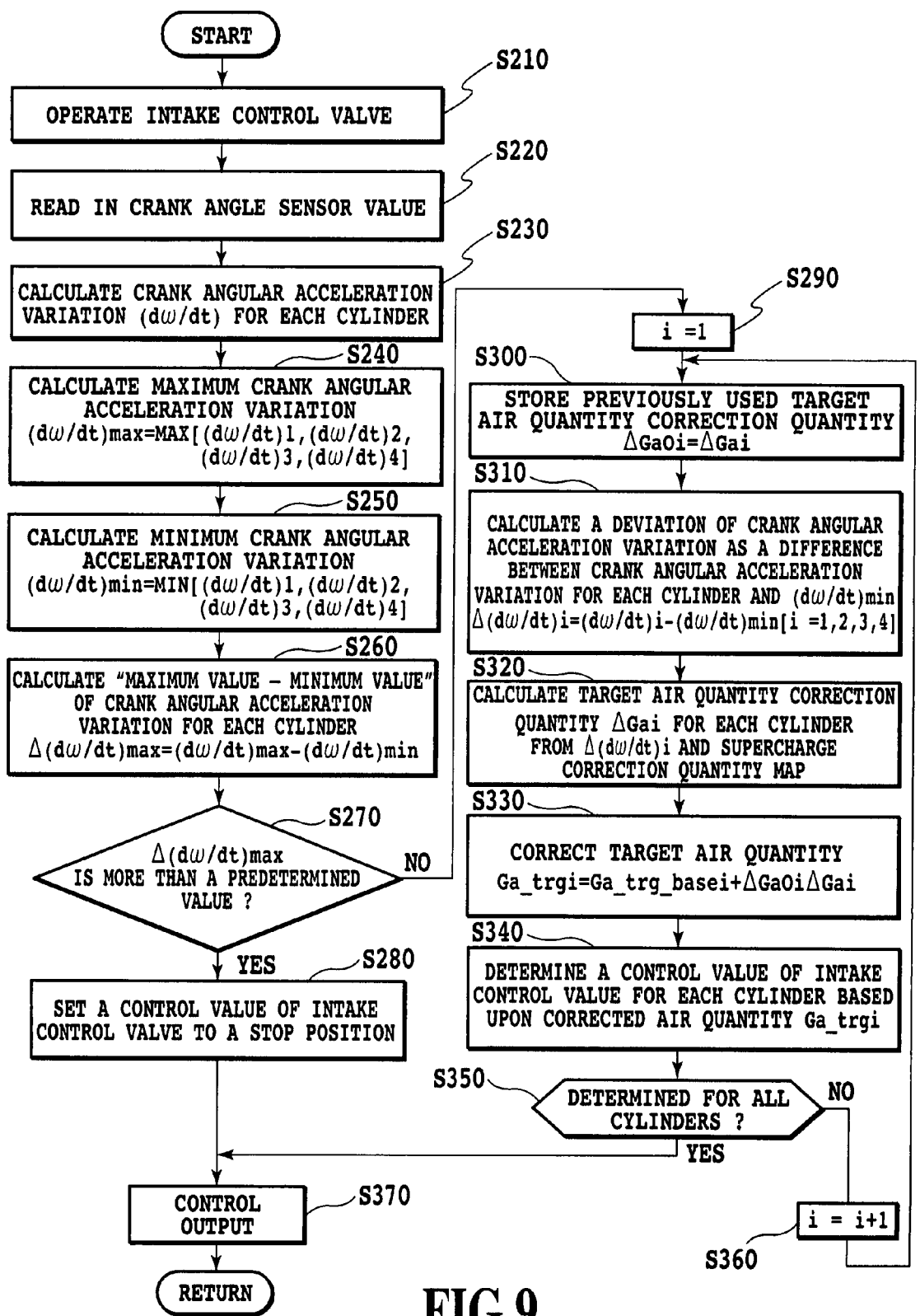
FIG. 9 is a flow chart showing the supercharge correction process in a second embodiment of the present invention.
Figure 10:
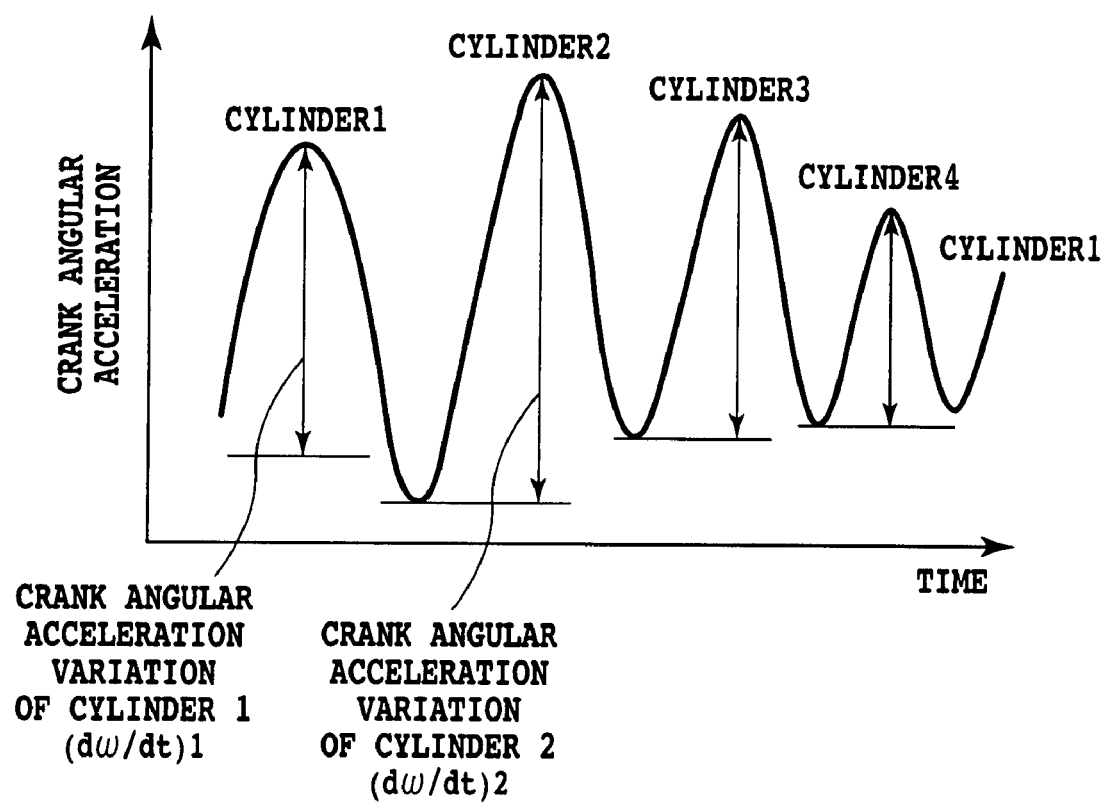
FIG. 10 is a time chart showing pulsation of crank angular acceleration.

An operation of the second embodiment will be explained. In FIG. 9, firstly the actuator 25 is driven by the control device 27, thereby operating the intake control valve 26 (S210). In addition, a detection value of the crank angle sensor 40 is read in (S220), and a crank angular acceleration variation ($d\omega/dt$) is calculated for every crank angle corresponding to each cylinder (S230). The crank angular acceleration variation ($d\omega/dt$) is a deviation between each minimum point and a maximum point subsequent to it in a fluctuating crank angular acceleration as shown in FIG. 10.

On condition that calculations of crank angular acceleration variations ($d\omega/dt$) for all cylinders are completed, the control device 27 calculates the maximum crank angular acceleration variation ($d\omega/dt$) max (S240) and the minimum crank angular acceleration variation ($d\omega/dt$) min (S250), respectively, among the calculated values.

Nextly, the control device 27 subtracts the minimum crank angular acceleration variation ($d\omega/dt$) min from the maximum crank angular acceleration variation ($d\omega/dt$) max to calculate a deviation $\Delta$ ($d\omega/dt$) max (S260).

Nextly, the control device 27 determines whether or not the deviation $\Delta$ ($d\omega$)/dt) max is more than a predetermined value (S270).

If the deviation is less than the predetermined value, the control device 27 resets a cylinder counter i to "1" (S290) to store the previously used target air quantity correction quantity ($\Delta$ Ga0$i$=$\Delta$ Gai, S300). Nextly, the control device 27 subtracts the minimum crank angular acceleration variation (d$\omega$/dt) min from the crank angular acceleration variation (d$\omega$/dt) i for each cylinder to calculate a deviation $\Delta$ (d$\omega$/dt) for each cylinder (S310). In addition, the control device 27 refers to the supercharge correction quantity map by the deviation $\Delta$ (d$\omega$/dt) i to calculate a target supercharge correction quantity $\Delta$ Gai (S320).

Nextly, the control device 27 adds the previously used target supercharge correction quantity $\Delta$ Ga0$i$ and the target supercharge correction quantity $\Delta$ Gai calculated at step S320 to a predetermined base value Ga_trg_basei to correct a target air quantity Ga_trgi for each cylinder (S330). In addition, control values of the intake control valve 26 for each cylinder, i.e. target valve opening timing, target valve opening period and target valve closing timing, are determined based upon the corrected target air quantity Ga_trgi (S340).

On condition that each process from steps S300 to S340 has been completed in all cylinders (S350, S360), the control device 27 controls the actuator 25 for each cylinder according to the control value of each cylinder (S370).

On the other hand, if the deviation $\Delta$ (d$\omega$/dt) max is more than the predetermined value at step S270, the control device 27 sets the control value of the intake control valve 26 to a value corresponding to a stop position of a fully open state (S280) and performs control output to the actuator 25 for each cylinder (S370).

As a result, the variations of the supercharge air quantity by the intake control valve 26 are to be corrected so that the crank angular acceleration of each cylinder is within a predetermined range from the minimum value out of all cylinders.

As thus described, in the present embodiment, the operating timing of the actuator 25 is corrected by the supercharge correction process so as to suppress the fluctuation of the rotational acceleration being an operating condition of the engine 10. In consequence, the present embodiment can suppress the unbalance in characteristic between the cylinders in an engine capable of performing the pulse charge.

Figure 11:
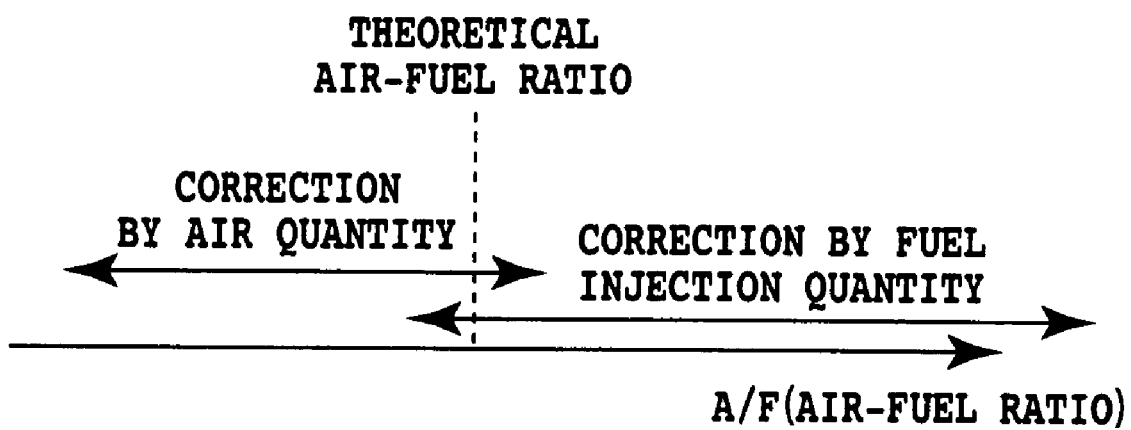
FIG. 11 is a concept diagram showing each region of correction by an intake air quantity and correction by a fuel injection quantity in the second embodiment.

In addition, in the present embodiment, the control device 27 stops the intake control valve 26 at a fully open state in a case where the fluctuation of the operating condition is greater than the predetermined value. Accordingly, in a case where there is a high possibility that the intake control valve 26 or the actuator 25 for opening/closing it is in an abnormal state, the engine can be transferred to an operating condition of not using the intake control valve 26. As a result, in the present embodiment, as shown in FIG. 11, in a region where an air-fuel ratio is substantially richer than a theoretical air-fuel ratio, the correction by the fuel injection quantity is not performed and the correction by the intake air quantity is performed. On the other hand, in a region where an air-fuel ratio is substantially leaner than a theoretical air-fuel ratio, the correction by the fuel injection quantity is performed and the correction by the intake air quantity is not performed. In consequence, the correction can be promptly and accurately performed.

Nextly, a third embodiment of the present invention will be explained.

The third embodiment is a modification of the supercharge correction process in the first embodiment. Variations between the cylinders in air quantity in the intake passage of the engine 10 are used in place of the fluctuation of the rotational speed of the engine 10. More specifically, the variations of the air quantity are detected by a pressure in the intake passage at the downstream side of the intake control valve 26 and at the upstream side of the intake valve 17.

Figure 12:
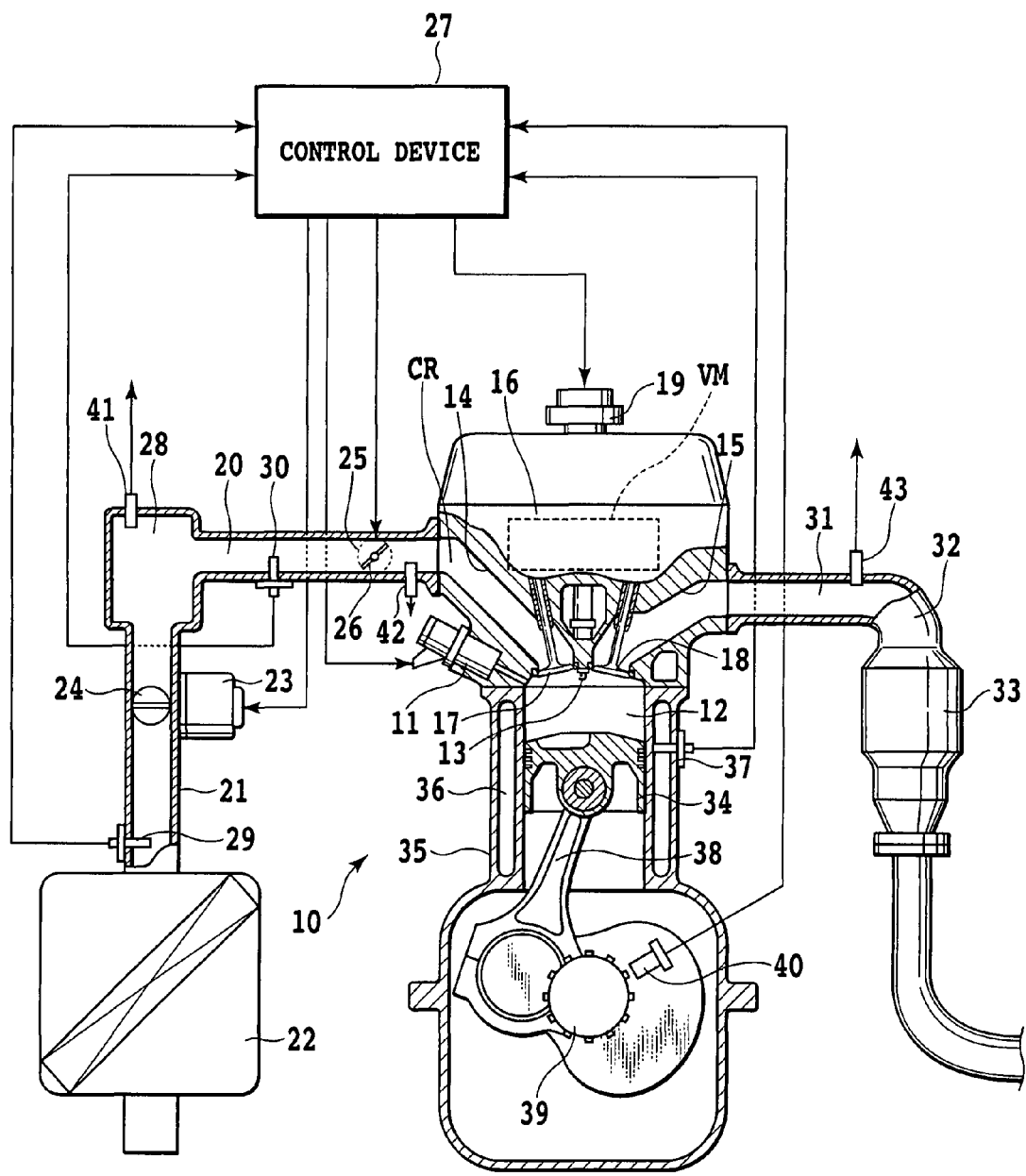
FIG. 12 is a concept diagram showing a mechanical construction in a third embodiment.

As shown in FIG. 12, a mechanical construction of the third embodiment includes an intake pressure sensor 41, a pressure sensor 42 and an A/F (air-fuel ratio) sensor 43 and the rest is the same as the first embodiment. The intake pressure sensor 41 is disposed in the intake passage 20 positioned at the downstream side of the throttle valve 24 and at the upstream side of the intake control valve 26 and outputs a signal in accordance with a pressure in the position (hereinafter referred to as intake manifold pressure) to the control device 27. The pressure sensor 42 is disposed in the intake passage 20 positioned at the downstream side of the intake control valve 26 and at the upstream side of the intake valve 17, and outputs a signal in accordance with a pressure in the position (hereinafter referred to as port pressure) to the control device 27. The single intake pressure sensor 41 is disposed in the surge tank 28 and the pressure sensor 42 is disposed for each cylinder, in more detail, for every branch pipe of each cylinder. The A/F sensor 43 is disposed in the exhaust passage 31 and outputs a signal in accordance with an air-fuel ratio to the control device 27. The A/F sensor 27 may be disposed for every branch pipe in the exhaust passage 31, or the single A/F sensor 27 may be disposed at the downstream side of a junction point of branch pipes. In the latter case, an A/F for each cylinder is calculated by the control device 27 based upon a detection value of the crank angle sensor, opening timing and closing timing of the exhaust valve 18 for each cylinder, and a predetermined delay time.

Figure 13:
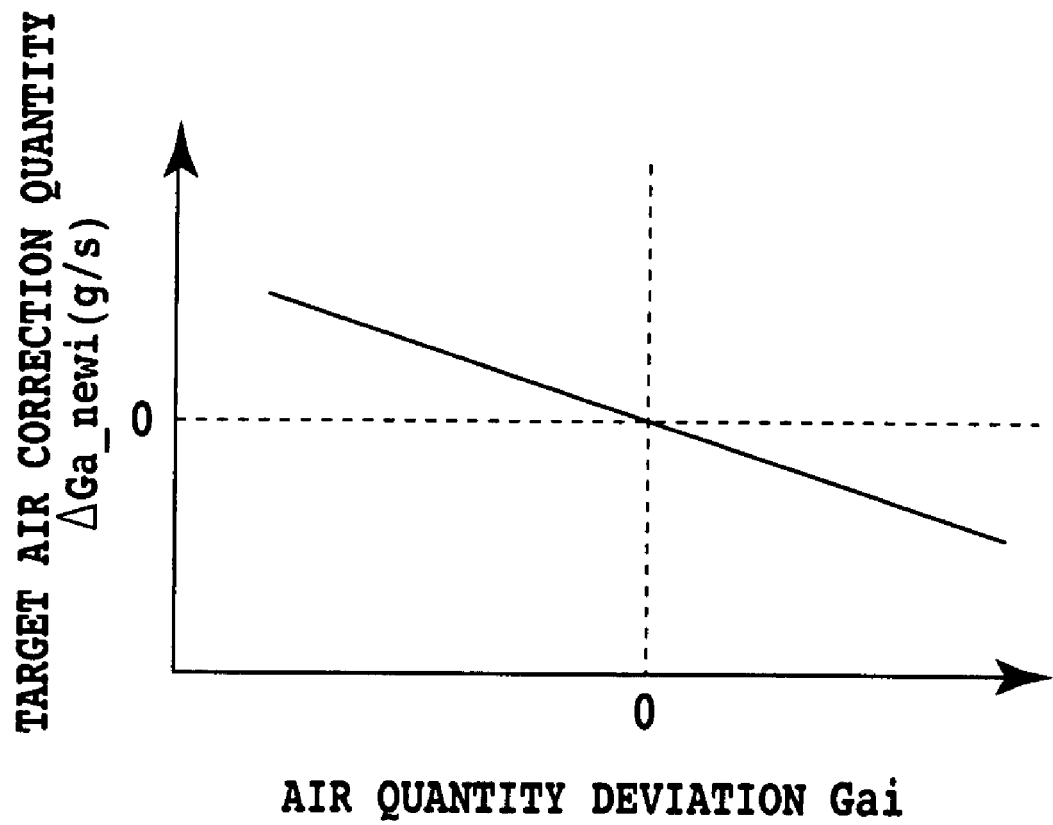
FIG. 13 is a graph showing a setting example of a supercharge correction quantity map used in the third embodiment.

In the present embodiment, the supercharge correction quantity map used for the supercharge correction process, as shown in FIG. 13, associates a deviation $\Delta$ Gai of the air quantity with a target supercharge correction quantity $\Delta$ Ga_newi (g/s) and stores these values therein. The deviation $\Delta$ Gai of the air quantity is a difference between an intake air quantity for each cylinder and an average value thereof. As shown in FIG. 13, the target supercharge correction quantity $\Delta$ Ga_newi (g/s) is a positive or a negative value and an absolute value thereof is set to become larger as an absolute value of the deviation $\Delta$ Gai of the air quantity is larger.

Figure 14:
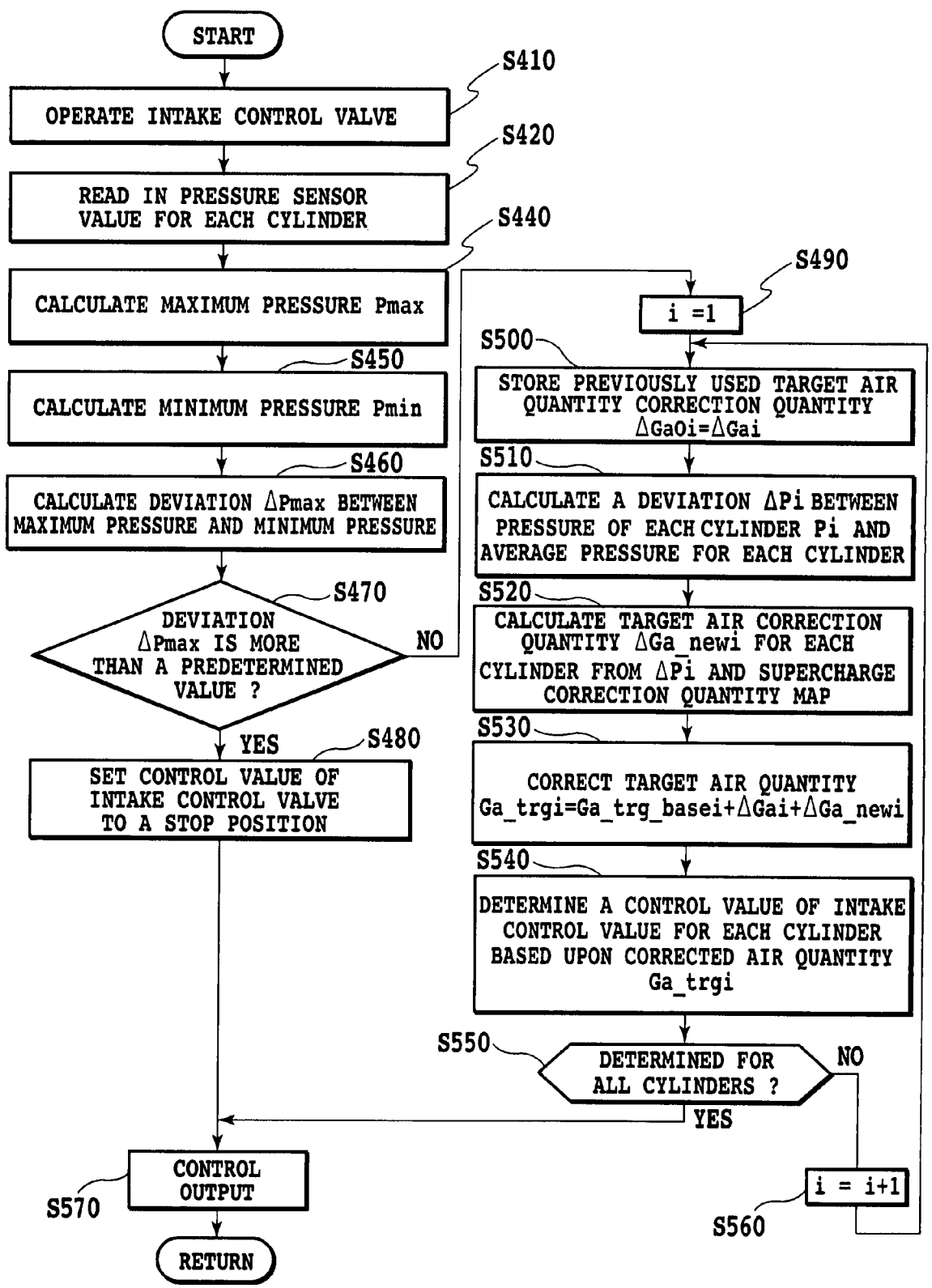
FIG. 14 is a flow chart showing the supercharge correction process in the third embodiment.

An operation of the third embodiment will be explained. In FIG. 14, firstly the actuator 25 is driven by the control device 27, thereby operating the intake control valve 26 (S410). In addition, a pressure value for each cylinder is read in based upon a detection value of the pressure sensor 42 (S420).

On condition that detections for pressure values of all cylinders are completed, the control device 27 calculates the maximum pressure Pmax (S440) and the minimum pressure Pmin (S450), respectively, among the detected values.

Nextly, the control device 27 subtracts the minimum pressure Pmin from the maximum pressure Pmax to calculate a pressure deviation $\Delta$ Pmax (S460).

Nextly, the control device 27 determines whether or not the pressure deviation $\Delta$ Pmax is more than a predetermined value (S470).

If the deviation $\Delta$ Pmax is less than the predetermined value, the control device 27 resets the cylinder counter i to "1" (S490) to store the previously used target air quantity correction quantity ($\Delta$ Ga0$i$=$\Delta$ Gai, S500). Nextly, the control device 27 calculates a deviation $\Delta$ Pi. An average value of the pressure Pave is subtracted from the pressure for each cylinder Pi to calculate the deviation $\Delta$ Pi for each cylinder (S510). It should be noted that the difference between the pressure Pi for each cylinder and the average value of the pressure Pave is calculated, but a difference between the pressure Pi for each cylinder and the minimum pressure Pmin may be assumed as the deviation $\Delta$ Pi.

In addition, the control device 27 refers to the supercharge correction quantity map by the pressure deviation Δ Pi to calculate a target supercharge correction quantity Δ Ga_newi (S520).

Nextly, the control device 27 adds the previously used target supercharge correction quantity Δ Ga0i, and the target supercharge correction quantity Δ Ga_newi calculated at step S520, to a predetermined base value Ga_trg_basei to correct the target air quantity Ga_trgi for each cylinder (S530). It should be noted that an addition of the target supercharge correction quantity Δ Ga0i and the target supercharge correction quantity Δ Ga_newi is to be stored as a target air quantity correction quantity Gai at step S500 in the next cycle.

Nextly, respective control values of the intake control valve 26 for each cylinder, i.e. target valve opening timing, target valve opening period and target valve closing timing, are determined based upon the target air quantity Ga_trgi after the correction (S540). The control value herein will be determined as follows. Firstly, a port pressure P3 at a predetermined timing after the closing of the intake control valve 26 is estimated by a predetermined function based upon a port pressure P1 detected at a predetermined detection timing before the opening of the intake control valve 26 based upon a crank angle, and a port pressure P2 detected before opening of the intake control valve 26 and after an elapse time of a delay time in accordance with an engine rotational speed from the detection time of the port pressure P1. Next, a target valve opening timing, a target valve opening period, and a target valve closing timing are calculated by another predetermined function based upon the estimated port pressure P3. It should be noted that the target valve closing period may be calculated by adding the target valve opening period to an actual valve opening period.

On condition that all processes from steps S500 to S540 are completed in all cylinders (S550, S560), the control device 27 controls the actuator 25 for each cylinder according to the control value of each cylinder (S570).

On the other hand, if the deviation Δ Pmax is more than the predetermined value at step S470, the control device 27 sets the control value of the intake control valve 26 to a value corresponding to a stop position of a fully open state (S480) and performs control output to the actuator 25 for each cylinder (S570).

As a result, the variations of the supercharge air quantity by the intake control valve 26 are to be corrected so that the pressure in each cylinder is within a predetermined range from the average value of all cylinders.

As described above, since the variations in the supercharge air quantity by the intake control valve 26 is to be corrected based upon the variations in the air quantity between the cylinders in the third embodiment, the correction can be performed without waiting for an ignition stroke.

It should be noted that in the third embodiment the variations in the air quantity between the cylinders are detected by the pressure sensor 43 in the intake passage at the downstream side of the intake control valve 26 and at the upstream side of the intake valve 17. However, the variations in the air quantity between the cylinders may be detected based upon an intake flow quantity or a pressure in the intake passage at the upstream side of the intake control valve 26. In a case of a using a hot-wire type air-flow meter as means for detecting the intake flow quantity at the upstream side of the intake control valve 26, since a measured value may be smaller than an actual value by the influence of intake fluctuations, it is preferable that a correction coefficient is calculated by a predetermined function based upon opening timing of the intake control valve 26 and an engine rotational speed, and the correction coefficient is multiplied, thus correcting the detection value of the air flow meter.

Nextly, a fourth embodiment of the present invention will be explained. The fourth embodiment is a modification of the supercharge correction process in the third embodiment. Fluctuations in an air-fuel ratio of the exhaust gas in the engine 10 are used in place of the fluctuations in the rotational speed of the engine 10. More specially, the fluctuations in the air-fuel ratio are detected by the A/F sensor 43.

Figure 15:
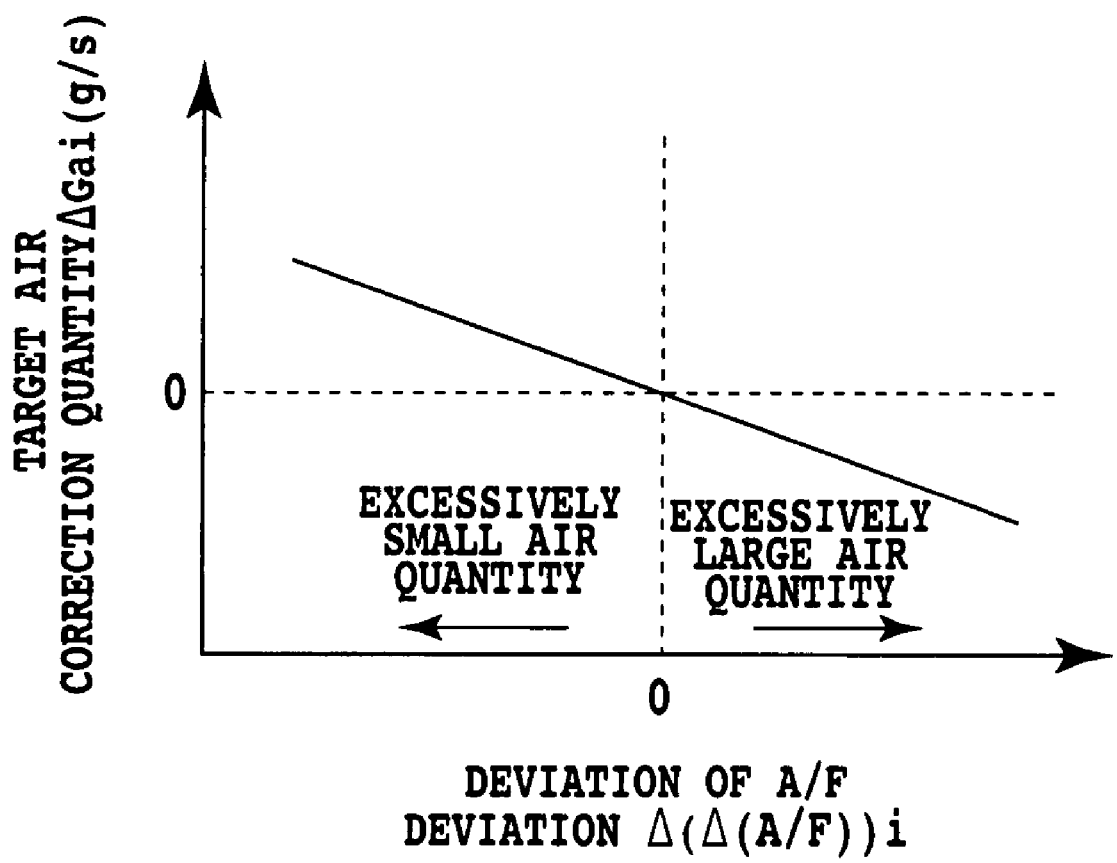
FIG. 15 is a graph showing a setting example of a supercharge correction quantity map used in a fourth embodiment.

In the present embodiment, the supercharge correction quantity map used for the supercharge correction process, as shown in FIG. 15, associates a deviation Δ (Δ(A/F)) i of the A/F deviation with a target supercharge correction quantity A Gai (g/s) and stores these values therein. The deviation Δ (Δ (A/F)) i of the A/F deviation is a difference between the A/F deviation for each cylinder and an average value thereof. As shown in FIG. 15, the target supercharge correction quantity Δ Gai (g/s) is a positive or a negative value and an absolute value thereof is set to become larger as an absolute value of the deviation Δ (Δ (A/F))i of the A/F deviation is larger.

Figure 16:
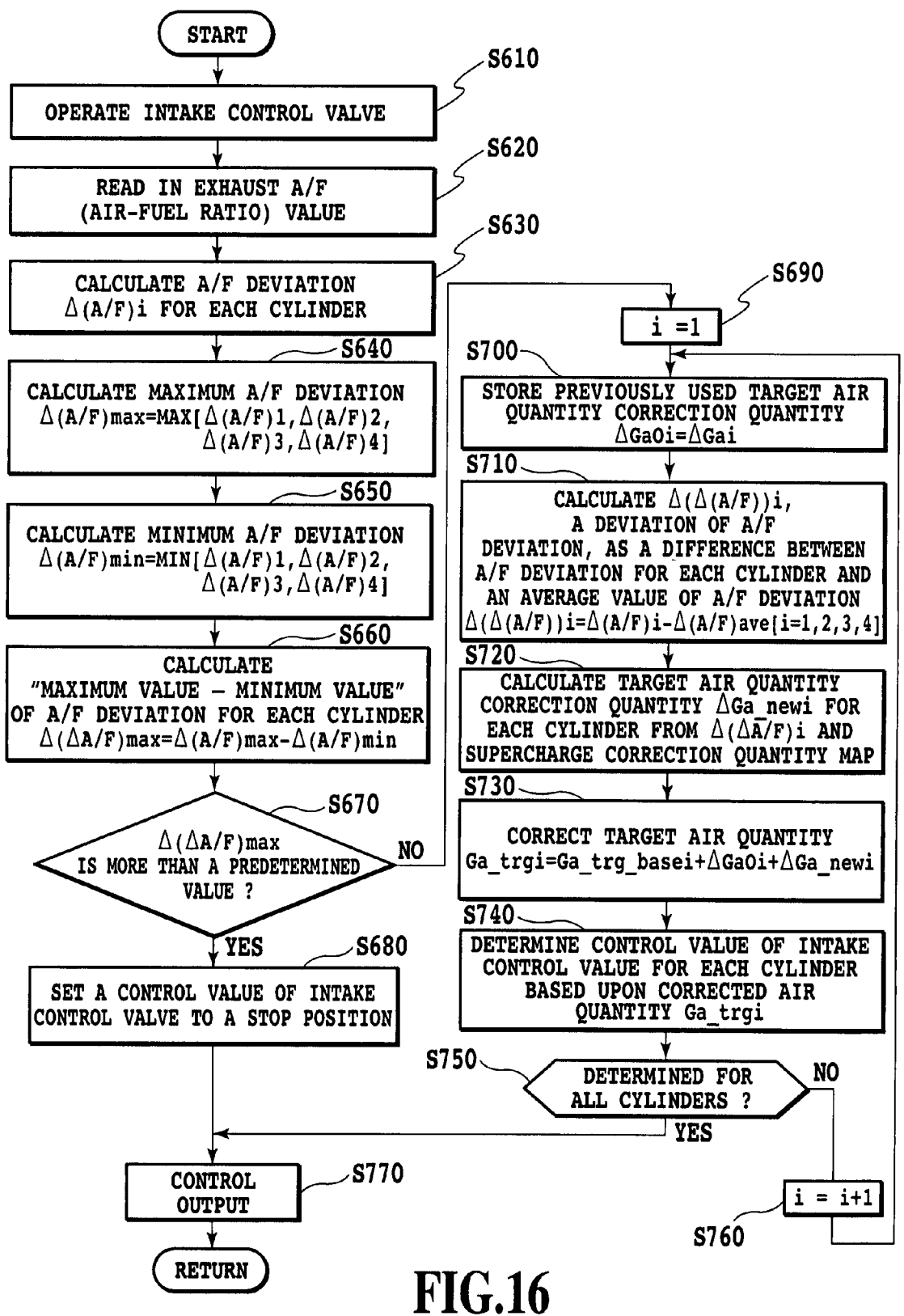
FIG. 16 is a flow chart showing the supercharge correction process in the fourth embodiment.

An operation of the fourth embodiment will be explained. In FIG. 16, firstly the actuator 25 is driven by the control device 27, thereby operating the intake control valve 26 (S610). In addition, an exhaust gas A/F for each cylinder is read in based upon detection values of the A/F sensor 43 and the crank angle sensor 40 (S620) and an A/F deviation Δ (A/F) i (i=1, 2, 3 and 4) for each cylinder is calculated (S630).

On condition that calculations of A/F deviations Δ (A/F) of all cylinders are completed, the control device 27 calculates the maximum A/F deviation Δ (A/F) max (S640) and the minimum A/F deviation Δ (A/F) min (S650), respectively, among the detected values.

Nextly, the control device 27 subtracts the minimum A/F deviation Δ (A/F) min from the maximum A/F deviation Δ (A/F) max to calculate a deviation Δ (Δ A/F) max of the A/F deviation (S660).

Next, the control device 27 determines whether or not the deviation Δ (Δ A/F) max of the A/F deviation is more than a predetermined value (S670).

If Δ (Δ A/F) max is less than the predetermined value, the control device 27 resets the cylinder counter i to "1" (S690) to store the previously used target air quantity correction quantity (Δ Ga0i=Δ Gai, S700). Nextly, the control device 27 calculates a deviation Δ (Δ A/F) i of the A/F deviation. An average value Δ (A/F) ave of the A/F deviation is subtracted from the A/F deviation Δ (A/F) i for each cylinder to calculate the deviation Δ (Δ A/F) i of the A/F deviation for each cylinder (S710).

In addition, the control device 27 refers to the supercharge correction quantity map by the deviation Δ (Δ A/F) of the A/F deviation to calculate a target supercharge correction quantity Δ Ga_newi (S720).

Nextly, the control device 27 adds the previously used target supercharge correction quantity Δ Ga0i and the target supercharge correction quantity Δ Ga_newi calculated at step S720, to a predetermined base value Ga_trg_basei to correct the target air quantity Ga_trgi for each cylinder (S730). It should be noted that an addition of the target supercharge correction quantity Δ Ga0i and the target supercharge correction quantity Δ Ga_newi is to be stored as a target air quantity correction quantity Gai at step S700 in the next cycle.

Nextly, the control device 27 determines respective control values of the intake control valve 26 for each cylinder, i.e. target valve opening timing, target valve opening period and target valve closing timing, based upon the target air quantity Ga_trgi after the correction (S740). The control value herein will be determined as follows. Firstly, a port pressure P3 at a predetermined timing after the closing of the intake control valve 26 is estimated by a predetermined function based upon a port pressure P1 detected at a predetermined detection timing before the opening of the intake control valve 26 based upon a crank angle, and a port pressure P2 detected before the opening of the intake control valve 26 and after an elapse of a delay time, in accordance with an engine rotational speed from the detection time of the port pressure P1. Nextly, a target valve opening timing, a target valve opening period, and a target valve closing timing, are calculated by another predetermined function based upon the port pressure P3. It should be noted that the target valve closing period may be calculated by adding the target valve opening period to an actual valve opening period.

On condition that all processes from steps S700 to S740 are completed in all cylinders (S750, S760), the control device 27 performs the control output to the actuator 25 for each cylinder according to the control value of each cylinder (S770).

On the other hand, if the deviation $\Delta$ (A/F) max is more than a predetermined value at step S670, the control device 27 sets the control value of the intake control valve 26 to a value corresponding to a stop position of a fully open state (S680) and performs the control output to the actuator 25 for each cylinder (S770).

On the other hand, if the deviation $\Delta$ (A/F) max is more than the predetermined value at step S470, the control device 27 sets the control value of the intake control valve 26 to a value corresponding to a stop position of a fully open position (S680) and performs control output to the actuator 25 for each cylinder (S770).

As a result, the variations of the supercharge air quantity by the intake control valves 26 are to be corrected so that the A/F of each cylinder is within a predetermined range from the average value of all cylinders.

It should be noted that each of the aforementioned embodiments has explained cases where the present invention is applied to a gasoline engine of a cylinder-in direct-injection type, but the present invention is also effective in other types of engines such as a port-injection type of engine for injecting fuel into an intake port, or a diesel engine not using a spark plug, which have the effect similar to that in a cylinder-in direct-injection type of gasoline engine. In addition, the present invention can also be applied to an engine other than a vehicular engine and such construction is also within the scope of the present invention.

The invention claimed is:

1. A control device for an engine, comprising:
an intake control valve disposed in an intake passage at an upstream side of an intake valve, in each of a plurality of cylinders in the engine, for individually opening/closing the intake passage;
an actuator for opening/closing the intake control valve;
control means for controlling an operation of the actuator, wherein the control means controls the actuator to delay opening of the intake control valve in relation to opening of the intake valve, thus performing supercharge of the engine;
supercharge correction means for individually correcting operating timing of the actuator based on a state value detected for each of the plurality of cylinders so that unbalance in a supercharge air quantity between the plurality of cylinders in the engine is suppressed;
injection quantity correction means for correcting a fuel injection quantity of the engine; and
correction instruction means for instructing execution of correction to the supercharge correction means and the injection quantity correction means, wherein the correction instruction means instructs to execute the injection quantity correction means with priority in a case where execution conditions of the supercharge correction means and the injection quantity correction means are both met, wherein:
even in a case where the execution conditions of the supercharge correction means and of the injection quantity correction means are both met, when a required air quantity of the engine is greater than a first reference value, the correction instruction means instructs to execute the supercharge correction means with priority.

2. A control device for an engine according to claim 1, wherein:
the supercharge correction means corrects the operating timing based upon a deviation in the state values between the cylinders of the engine.

3. A control device for an engine according to claim 1, wherein:
the state value includes a rotational speed of at least one of the plurality of cylinders of the engine.

4. A control device for an engine according to claim 1, wherein:
the state value includes a rotational acceleration of at least one of the plurality of cylinders of the engine.

5. A control device for an engine according to claim 1, wherein:
the state value includes an air quantity in an intake passage in fluid communication with at least one of the plurality of cylinders of the engine.

6. A control device for an engine according to claim 5, wherein:
the air quantity is detected based upon a pressure in the intake passage at a downstream side of the intake control valve and at the upstream side of the intake valve.

7. A control device for an engine according to claim 5, wherein:
the air quantity is detected based upon an intake flow quantity or a pressure in the intake passage at the upstream side of the intake control valve.

8. A control device for an engine according to claim 1, wherein:
the state value includes an air-fuel ratio of each of the plurality of cylinders throughout a single combustion cycle, respectively.

9. A control device for an engine according to claim 1, wherein:
the control means stops the intake control valve at a fully open state in a case where the deviation of state values is greater than a predetermined value.

10. A control device for an engine, comprising:
an intake control valve disposed in an intake passage at an upstream side of an intake valve, in each of a plurality of cylinders in the engine, for individually opening/closing the intake passage;
an actuator for opening/closing the intake control valve;
control means for controlling an operation of the actuator, wherein the control means controls the actuator to delay opening of the intake control valve in relation to opening of the intake valve, thus performing supercharge of the engine;
supercharge correction means for individually correcting operating timing of the actuator based on a state value detected for each of the plurality of cylinders so that unbalance in a supercharge air quantity between the plurality of cylinders in the engine is suppressed;
injection quantity correction means for correcting a fuel injection quantity of the engine; and correction instruction means for instructing execution of correction to the supercharge correction means and the injection quantity correction means, wherein the correction instruction means instructs to execute the injection quantity correction means with priority in a case where execution conditions of the supercharge correction means and the injection quantity correction means are both met, wherein:

even in a case where the execution conditions of the supercharge correction means and of the injection quantity correction means are both met, when a required air quantity of the engine is greater than a second reference value, the correction instruction means instructs to perform the supercharge without instructing to execute any of the supercharge correction means and the injection quantity correction means.

11. A control device for an engine, comprising:

an intake control valve disposed in an intake passage at an upstream side of an intake valve, in each of a plurality of cylinders in the engine, for individually opening/closing the intake passage;

an actuator for opening/closing the intake control valve;

control means for controlling an operation of the actuator, wherein the control means controls the actuator to delay opening of the intake control valve in relation to opening of the intake valve, thus performing supercharge of the engine;

supercharge correction means for individually correcting operating timing of the actuator based on a state value detected for each of the plurality of cylinders so that unbalance in a supercharge air quantity between the plurality of cylinders in the engine is suppressed;

injection quantity correction means for correcting a fuel injection quantity of the engine; and correction instruction means for instructing execution of correction to the supercharge correction means and the injection quantity correction means, wherein the correction instruction means instructs to execute the injection quantity correction means with priority in a case where execution conditions of the supercharge correction means and the injection quantity correction means are both met, wherein:

even in a case where the execution conditions of the supercharge correction means and of the injection quantity correction means are both met, when an air-fuel ratio of the engine is greater than a third reference value, the correction instruction means instructs to execute the supercharge correction means with priority.

12. A control device for an engine according to claim 11, wherein:

even in a case where the execution conditions of the supercharge correction means and of the injection quantity correction means are both met, when a required air quantity of the engine is greater than a fourth reference value, the correction instruction means instructs to perform the supercharge without instructing to execute any of the supercharge correction means and the injection quantity correction means.

* * * * *

UNITED STATES PATENT AND TRADEMARK OFFICE
CERTIFICATE OF CORRECTION

| | |
|---|---|
| PATENT NO. | : 8,006,676 B2 |
| APPLICATION NO. | : 11/887280 |
| DATED | : August 30, 2011 |
| INVENTOR(S) | : Masakazu Tabata et al. |

It is certified that error appears in the above-identified patent and that said Letters Patent is hereby corrected as shown below:

IN THE SPECIFICATIONS:

Column 11, Line 8,    Before "for" insert --i--.

Column 14, Line 13,   Change "quantity A" to --quantity $\Delta$--.

Column 14, Line 28,   Change "$\Delta$ (A/F) of" to --$\Delta$ (A/F) i of--.

Column 14, Line 50,   Change "$\Delta$ ($\Delta$A/F) of" to --$\Delta$ ($\Delta$A/F) i of--.

Signed and Sealed this
Twentieth Day of March, 2012

David J. Kappos
*Director of the United States Patent and Trademark Office*